UNITED STATES PATENT OFFICE.

ERNEST LESLIE RANSOME, OF OAKLAND, CALIFORNIA.

MANUFACTURE OF BRICKS FROM CITY REFUSE.

SPECIFICATION forming part of Letters Patent No. 516,112, dated March 6, 1894.

Application filed November 6, 1893. Serial No. 490,184. (No specimens.)

*To all whom it may concern:*

Be it known that I, ERNEST LESLIE RANSOME, a citizen of the United States, residing at Oakland, in the county of Alameda and State of California, have invented certain new and useful Improvements in the Manufacture of Bricks from City Refuse; and I do hereby declare that the following is a full, clear, and exact description of the invention, which will enable others skilled in the art to which it appertains to make and use the same.

Heretofore under the process patented by me July 21, 1885, No. 322,559, it has been found practically impossible to fully utilize the lime burned with the refuse, without grinding the limed clinker so fine as, both to render necessary the use of more lime, than would otherwise be required and to materially increase the cost of grinding and injure the quality of the brick. Ordinarily the limestone, or material from which the lime is made, is broken or otherwise reduced into small lumps or grains and mixed with the refuse matter before it is introduced into the furnace. In burning, the whole mass usually forms into one immense honeycomb clinker in which these lumps are embedded. The outside surface of each of these, combines with some of the other material of the clinker forming therewith a hard shell inside of which is the rest of the substance of the lump more or less burned into quick lime. This shell is hard to slake, and in passing through the slaking process enveloping the rest of the lump as it does, it for the most part prevents that from fully slaking, and in other cases where this shell is not impervious enough to prevent its core from slaking, yet it retards, and prevents much of the lime after slaking from properly powdering out. Unless, therefore, this limed clinker is very finely ground it will after grinding contain large grains of this unslacked shell, and of the unslaked lime formerly contained within the shell and also coarse cores of slaked lime partly embedded in its shell. When very finely ground, all these substances, the shell, and the slaked and unslaked lime, are fully utilized as follows: The shell acts after the manner of hydraulic lime. The unslaked lime slakes sufficiently quickly during the subsequent processes of mixing with water to avoid all danger from subsequent slaking, while all of the slaked lime together with the ground shell is thoroughly mixed and disseminated throughout the mass. When this material is not finely ground, and is formed into bricks, the shell, and unslaked lime are for the most part, and the slaked lime somewhat not only wasted, but they give bad results in two ways as follows: After being molded into bricks, the unslaked lime gradually slakes, and in so doing disintegrates the brick, while the large grains or pockets of slaked lime dissolve and wash out making the bricks weak and unsightly. In consequence of this waste a greater proportion of lime has to be used than would otherwise be necessary. In addition to the expense of this extra proportion of lime, this excess is detrimental to the brick in another way. With the right amount of lime fully utilized, it all becomes gradually combined with the available silica or other ingredients of the brick, forming therewith a hydraulic cement that will harden under water. Any excess of lime that remains unconverted in the brick acts as a dilutent to the cement and keeps the brick from hardening properly besides rendering it less fire proof. By my present improvement I burn the lime with one portion of the refuse in one kiln, and I burn the rest of the refuse in another kiln. After burning I grind the limed clinker very fine, into a dust, and the unlimed clinker out of the other kiln is broken or granulated as coarsely as the character of the brick demands. The two grindings are then thoroughly mixed together and formed into bricks after the usual manner. In proportioning the quantities in the two kilns, I use enough refuse with the lime both to thoroughly burn it, and to make enough limed clinker dust, when ground, to furnish the proper proportion of fine material for mixing with the coarser ground clinker. No exact proportion can be given because the character of the refuse varies so greatly. The usual proportion would be about twenty-five per cent. of the refuse.

By the term city refuse, I include all waste combustible matter, such as the cinders from furnaces, coal slack, sawdust, straw, manure, shavings and all house refuse that is combustible. Under the name brick, I include all forms and shapes of artificial stone, and also I regard mortar as the equivalent to brick for the purpose of this invention, as it is only artificial stone in a soft state.

As Letters Patent No. 322,559, of July 21, 1885, were granted me for the manufacture of bricks, &c., from purified ashes, I claim no independent rights herein, so far as this application relates to the purification of the refuse by fire; but regard this process as an improvement in the method of manufacturing those bricks rather than as an entirely independent invention.

Having thus fully described my invention, what I claim, and desire to secure by Letters Patent, is—

The process of making artificial blocks or stones from city refuse, consisting in dividing it into two portions, to one of which limestone is added, burning both portions separately, and subsequently grinding the limed portion to fine powder and crushing the other portion into coarse grains, then mixing the two portions together with the necessary quantity of water and molding the mixture into the required shapes.

ERNEST LESLIE RANSOME.

Witnesses:
H. F. THOMSEN,
MINNIE PATERSON.